United States Patent
Berrier

(10) Patent No.: US 6,250,006 B1
(45) Date of Patent: Jun. 26, 2001

(54) SHOPPING AID

(76) Inventor: Phil Berrier, Box 2533, Minnen, NV (US) 89423

( * ) Notice: Subject to any disclaimer, the term of this patent is extended or adjusted under 35 U.S.C. 154(b) by 0 days.

(21) Appl. No.: 09/358,089

(22) Filed: Jul. 21, 1999

(51) Int. Cl.$^7$ ........................................................ G09F 3/16
(52) U.S. Cl. ................................................. 40/666; 40/308
(58) Field of Search ........................ 40/666, 308, 661.01, 40/600

(56) References Cited

U.S. PATENT DOCUMENTS

| | | |
|---|---|---|
| 3,769,720 | 11/1973 | Terrones . |
| 3,881,267 | * 5/1975 | Hicks . |
| 3,956,841 | * 5/1976 | Hensel . |
| 4,034,539 | * 7/1977 | Economy . |
| 4,176,478 | 12/1979 | Brewer . |
| 4,274,567 | * 6/1981 | Sawyer . |
| 4,287,676 | * 9/1981 | Weinhaus . |
| 4,817,320 | 4/1989 | Fraynd . |
| 4,858,353 | * 8/1989 | Krebs et al. . |
| 5,086,960 | * 2/1992 | Schwietzer . |
| 5,127,674 | * 7/1992 | Lamphere et al. . |
| 5,154,330 | * 10/1992 | Haynes . |
| 5,295,342 | 3/1994 | Roche et al. . |
| 5,495,686 | 3/1996 | Millard et al. . |
| 5,704,147 | 1/1998 | Rellinger . |
| 6,000,610 | * 12/1999 | Talbott et al. . |

* cited by examiner

*Primary Examiner*—Terry Lee Melius
*Assistant Examiner*—William L. Miller
(74) *Attorney, Agent, or Firm*—Kenneth L Tolar

(57) ABSTRACT

A device for assisting a shopper includes a substantially rectangular panel having front and rear surfaces. The front surface includes a layer of dry erase material having numerous sets of indicia permanently imprinted thereon. Each set of indicia describes a select household item. Immediately adjacent each set of indicia is a blank box which may be marked with a dry erase marker to signify that the corresponding product has been depleted. Blank spaces are interspersed among the sets of indicia allowing the user to write additional item descriptions therein. Each blank space also includes a blank box adjacent thereto. A magnetic pad is disposed on the rear surface of the pad allowing it to be conveniently displayed on a refrigerator door. A detachable clamp assembly allows the device to be attached to a shopping cart whereby the box adjacent a product is marked as it becomes depleted and the mark is erased upon the depleted item being purchased at the store.

4 Claims, 2 Drawing Sheets

SHOPPING AID

BACKGROUND OF THE INVENTION

The present invention relates to a preprinted dry erase type board attachable to either a shopping cart or a refrigerator to remind a user of particular items needed at the grocery store.

DESCRIPTION OF THE PRIOR ART

Typically, shoppers compile a written list of items to be purchased at the grocery store. However, because the list is typically compiled within a few minutes, items are often inadvertently omitted. Furthermore, compiling and maintaining such a list is tedious and inconvenient. The present invention provides a shopping aid that allows shoppers to easily monitor grocery items.

Various reminder display systems exist in the prior art. For example, U.S. Pat. No. 4,817,320 issued to Fraynd relates to a shopper's reminder system including two display surfaces, one of which is provided for products existing in the household in adequate supply and the other being indicative of items requiring replenishment. A plurality of indicator elements each having indicia formed thereon are transferable between the two display surfaces thereby serving as a visual reminder that certain items need to be replenished.

U.S. Pat. No. 5,704,147 issued to Rellinger relates to a magnetic letter board assembly.

U.S. Pat. No. 5,495,686 issued to Millard et al relates to a decorative device with a smooth opaque magnetic display surface for magnets.

U.S. Pat. No. 5,295,342 issued to Roche et al relates to a display panel having dual securement means.

U.S. Pat. No. 4,176,478 issued to Brewer relates to a calender.

U.S. Pat. No. 3,769,720 issued to Terrones relates to an educational teaching board in four food groups.

Although various display devices for assisting a shopper exist in the prior art, none relate to a dry erasable surface having various phrases printed thereon, each corresponding to common household items. A blank box adjacent the phrase may be marked with an accompanying marker when the item is depleted. When the item is purchased, the mark is erased. Space is also provided so that a user may write a description of less common items not otherwise included in the pre-printed phrases.

SUMMARY OF THE INVENTION

The present invention relates to a device for assisting a shopper including a substantially rectangular planar panel having a front surface and a rear surface. The front surface includes a layer of "dry erase" material allowing ink to be repeatedly applied and removed. Permanently imprinted on the dry erase layer are a plurality of phrases or words, each relating to a common grocery or household item such as bread, milk, cereal, etc. Immediately adjacent each phrase or word is a box which a user may mark with a dry erase marker to indicate that the particular item needs replenishment. Once the item is purchased, the mark may be erased. A magnet is disposed on the rear surface of the panel allowing the panel to be conveniently displayed on a refrigerator or similar surface. The panel also includes a magnetic clip assembly for securing the panel to a shopping cart. It is therefore an object of the present invention to provide a shopping aid that is easy-to-use and inexpensive-to-manufacture.

It is another object of the present invention to provide a shopping aid that includes a detachable clip and a magnetic rear surface allowing the device to be interchangeably attached to a shopping cart or refrigerator.

It is yet another object of the present invention to provide a shopping aid having a plurality of both preprinted text and blank spaces, each corresponding to a select household item allowing a user to visually designate that such item needs replenishment. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
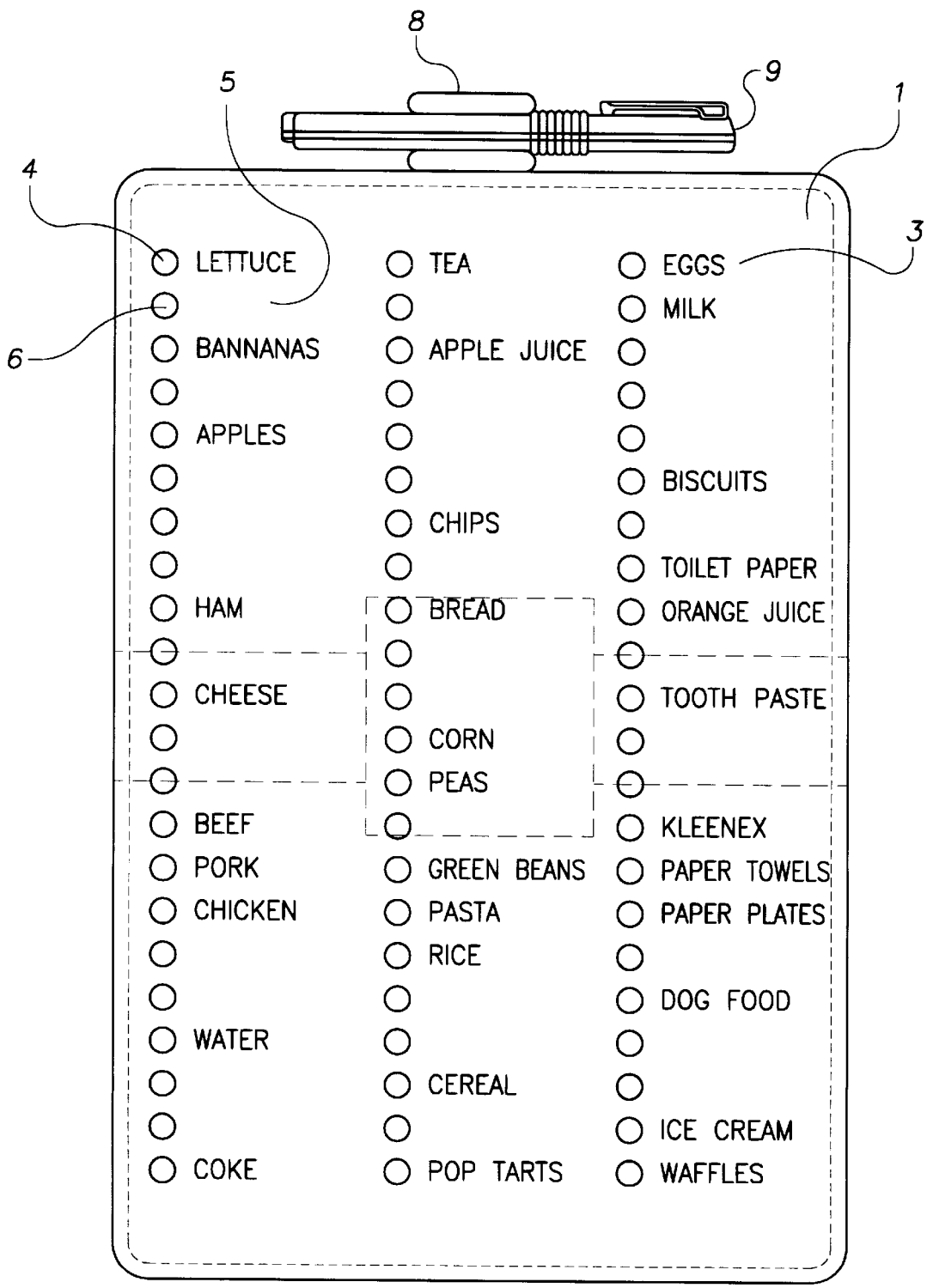
FIG. 1 is a front view of the present invention.
Figure 2:
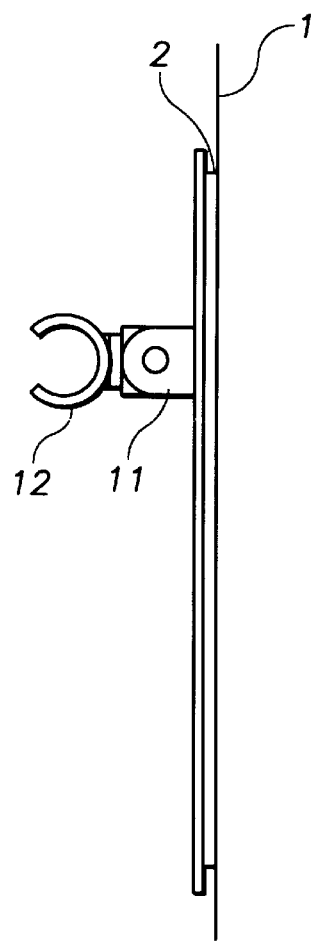
FIG. 2 is a side view of the inventive device attached to a refrigerator door.
Figure 3:
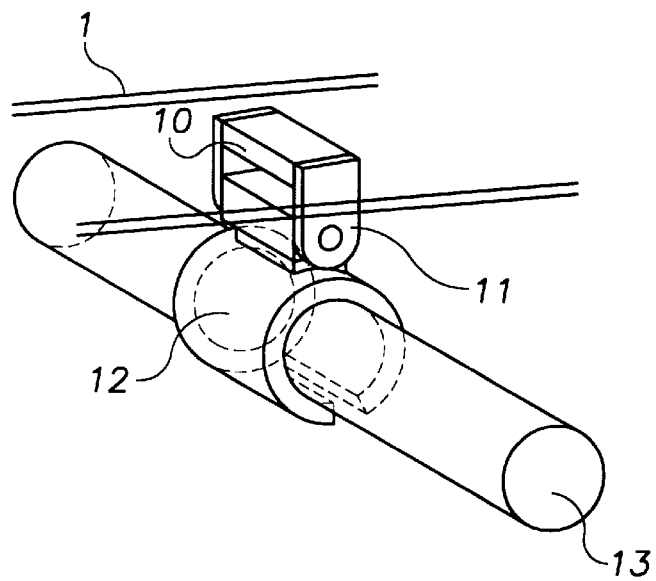
FIG. 3 is a perspective detailed view of the attachment clip.

Referring now to FIGS. 1 through 3, the present invention relates to a device for assisting a shopper. The device comprises a substantially rectangular planar panel 1 having a front surface and a rear surface. On the rear surface of the panel is a magnetic pad 2 for securing the panel to a refrigerator or similar location. Overlaying the front surface is a layer of dry erase material. Permanently imprinted on the dry erase layer are numerous sets of indicia 3, each set relating to a word or phrase for describing a select, more common household item. Immediately adjacent each set of indicia is a blank box 4 which may be marked with a dry erase marker whenever the particular item needs replenishing. Interspersed among the various sets of indicia are blank spaces 5 with a box 6 adjacent thereto allowing a user to write and erase descriptions of less common items.

Attached to the top edge of the panel is a clip 8 with a dry erase marker 9 received therein. The device also includes a detachable clamp assembly for securing the device to a shopping cart. The clamp assembly includes a magnetic base member 10 having a flange 11 attached to each of two opposing ends. Hingedly attached to each flange is a C-shaped clamp member 12 which may be snapped about a shopping cart handle 13. The clamp assembly may therefore be magnetically attached to the rear surface of the panel when the clamp assembly is needed or to the front surface of the panel when the panel is secured to a refrigerator door.

To use the above described device, the panel is magnetically secured to a convenient location such as a refrigerator door. As various grocery items become deplenished, the box adjacent the description of the deplenished item is marked. When going to a grocery store, the user takes the panel and attaches it to his or her shopping cart using the clamp assembly. As each item is selected and placed into the shopping cart, the mark adjacent the description of the selected item is erased.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A device for assisting a shopper comprising:

a substantially planar panel having front and rear surfaces; said front surface including numerous sets of indicia thereon, each set of indicia corresponding to a common household item;

an erasable marker removably attachable to said panel for placing a mark immediately adjacent each set of indicia as the item corresponding thereto is depleted whereby said mark is erased upon said item being replenished;

a clamp assembly magnetically securable to said panel for securing said panel to a shopping cart handle.

2. The device according to claim 1 wherein the front surface of said panel further includes a plurality of blank spaces interspersed among said sets of indicia allowing a user to write a description of a desired household item thereon.

3. The device for assisting a shopper according to claim 2 wherein each blank space and each set of indicia include a blank box immediately adjacent thereto which is marked to designate that said item has been depleted.

4. The device for assisting a shopper according to claim 1 wherein the rear surface of said panel includes a magnetic pad thereon for attaching said panel to a refrigerator door.

* * * * *